United States Patent
Yamazaki

(10) Patent No.: US 8,339,657 B2
(45) Date of Patent: Dec. 25, 2012

(54) IMAGE DATA PROCESSING APPARATUS

(75) Inventor: Masataka Yamazaki, Kuwana (JP)

(73) Assignee: Brother Kogyo Kabushiki Kaisha, Nagoya-Shi, Aichi-Ken ( * ) Notice: Subject to any disclaimer, the term of this patent is extended or adjusted under 35 U.S.C. 154(b) by 1322 days.

(21) Appl. No.: 11/691,634

(22) Filed: Mar. 27, 2007

(65) Prior Publication Data

US 2007/0229865 A1   Oct. 4, 2007

(30) Foreign Application Priority Data

Mar. 31, 2006   (JP) .................................. 2006-98210

(51) Int. Cl.
- H04N 1/00 (2006.01)
- G03G 15/00 (2006.01)
- B65H 5/22 (2006.01)

(52) U.S. Cl. .................... 358/1.6; 399/405; 271/3.01
(58) Field of Classification Search ................. 358/1.6, 358/1.9, 1.14; 399/405
See application file for complete search history.

(56) References Cited

U.S. PATENT DOCUMENTS

| | | | | |
|---|---|---|---|---|
| 5,308,058 | A * | 5/1994 | Mandel et al. | 271/289 |
| 5,328,169 | A * | 7/1994 | Mandel | 271/290 |
| 5,358,238 | A | 10/1994 | Mandel et al. | |
| 5,497,984 | A * | 3/1996 | Murakami et al. | 270/58.02 |
| 5,551,686 | A * | 9/1996 | Sanchez et al. | 271/298 |
| 5,703,628 | A | 12/1997 | Nishiyama | |
| 6,587,218 | B2 | 7/2003 | Noda | |
| 6,781,823 | B1 * | 8/2004 | Nyack | 361/679.29 |
| 6,985,247 | B2 | 1/2006 | Utsunomiya | |
| 7,426,045 | B2 * | 9/2008 | Horiyama | 358/1.13 |
| 2004/0252323 | A1 | 12/2004 | Mimamino | |
| 2006/0033942 | A1 * | 2/2006 | Yamazaki et al. | 358/1.12 |
| 2006/0238798 | A1 * | 10/2006 | Justice et al. | 358/1.15 |
| 2007/0063427 | A1 * | 3/2007 | Hong | 271/220 |
| 2007/0091348 | A1 * | 4/2007 | Asaka | 358/1.14 |

FOREIGN PATENT DOCUMENTS

| | | |
|---|---|---|
| JP | 6-237348 A | 8/1994 |
| JP | 6253066 | 9/1994 |
| JP | 7-057098 A | 3/1995 |
| JP | 7-143297 A | 6/1995 |
| JP | 8172498 | 7/1996 |

(Continued)

OTHER PUBLICATIONS

JP Office Action dtd Jul. 21, 2009, JP Appln. 2006-098210.

(Continued)

*Primary Examiner* — Marivelisse Santiago Cordero
*Assistant Examiner* — Mesfin Getaneh
(74) *Attorney, Agent, or Firm* — Banner & Witcoff, Ltd.

(57) ABSTRACT

An image data processing apparatus includes an execution device, a use determination device, an identification device, an execution determination device, and a control device. The execution device executes a predetermined data processing of image data. The use determination device determines at least one used amount in at least one specified portion which is used when the data processing is executed. The identification device identifies an attribute of the image data. The execution determination device determines whether or not to execute the data processing of the image data based on the attribute of the image data identified by the identification device and the at least one used amount determined by the use determination device. The control device makes the execution device execute the data processing of the image data when it is determined by the execution determination device to execute the data processing.

19 Claims, 7 Drawing Sheets

FOREIGN PATENT DOCUMENTS

| | | |
|---|---|---|
| JP | 8-259093 A | 10/1996 |
| JP | 8-317188 A | 11/1996 |
| JP | 2000-019899 A | 1/2000 |
| JP | 2000022874 | 1/2000 |
| JP | 2001-169046 A | 6/2001 |
| JP | 2001213564 | 8/2001 |
| JP | 2001-268299 A | 9/2001 |
| JP | 2002044365 | 2/2002 |
| JP | 2002067453 | 3/2002 |
| JP | 3443861 B2 | 9/2003 |
| JP | 2004-357013 A | 12/2004 |
| JP | 3733213 B2 | 1/2006 |
| JP | 2007-179453 A | 7/2007 |

OTHER PUBLICATIONS

JP Office Action dtd Nov. 11, 2008, JP Appln. 2006-098210.

JP Office Action dtd Oct. 27, 2009, JP Appln. 2006-098210, English Translation.

* cited by examiner

FIG.5

| IMAGE DATA ATTRIBUTES | THRESHOLD OF LOADED RATIO |
|---|---|
| COPY | 2/3 |
| PC PRINT | 2/3 |
| FAX | 3/4 |
| PC PRINT (ADMINISTRATOR) | 1 (FULLY LOADED) |
| FAX (PREDETERMINED DESTINATION) | 1 (FULLY LOADED) |

IMAGE DATA PROCESSING APPARATUS

CROSS-REFERENCE TO RELATED APPLICATIONS

This application claims the benefit of Japanese Patent Application No. 2006-98210 filed Mar. 31, 2006 in the Japanese Patent Office, the disclosure of which is incorporated herein by reference.

BACKGROUND

The present invention relates to an image processing apparatus that performs a predetermined image data processing on a plurality of types of image data having different attributes.

A typical known multifunction machine has a variety of functions, such as a copier function, a facsimile function, and a printer function. Such a multifunction machine is capable of performing copying of a document, performing transmission/reception of facsimile through a public telephone network, and performing printing in response to a command input from a connected personal computer (hereinafter referred to as a "PC").

SUMMARY

In the above multifunction machine, a variety of data, including document image data read from a document to perform the copier function, facsimile reception image data received by the facsimile function, and PC image data received from the PC, is temporarily stored in a memory, such as a DRAM, for managing the variety of data. The stored variety of data is read from the memory and subsequently is printed or outputted to a device, such as the PC, in accordance with a setting of the multifunction machine.

However, the above multifunction machine involves the following problems. Specifically, since it is required to manage a plurality of types of image data corresponding to a plurality of functions in the multifunction machine, data amount of inputted image data sometimes exceeds a capacity of the memory. In this case, the image data cannot be stored.

Also, although printing of image data temporarily stored in the memory is usually started promptly, a sheet discharge tray sometimes become full of printed sheets. Then, printing of the image data may become unable. Once storage or printing of image data becomes unable as above, further data processing such as storage or printing of inputted data becomes completely nonexecutable, regardless of the importance of the image data.

Accordingly, it is desirable to provide an image data processing apparatus in which data processing is securely performed with respect to image data having a specified attribute.

The present invention provides an image data processing apparatus which includes an execution device, a use determination device, an identification device, an execution determination device, and a control device. The execution device executes a predetermined data processing of image data. The use determination device determines at least one used amount in at least one specified portion which is used when the data processing is executed. The identification device identifies an attribute of the image data. The execution determination device determines whether or not to execute the data processing of the image data based on the attribute of the image data identified by the identification device and the at least one used amount determined by the use determination device. The control device makes the execution device execute the data processing of the image data when it is determined by the execution determination device to execute the data processing.

BRIEF DESCRIPTION OF THE DRAWINGS

A preferred embodiment of the present invention will be described hereinafter with reference to the drawings, in which:

FIG. 5 an explanatory view showing a relationship between attributes of image data and thresholds of a loaded ratio;

DETAILED DESCRIPTION OF THE PREFERRED EMBODIMENTS

Figure 1:
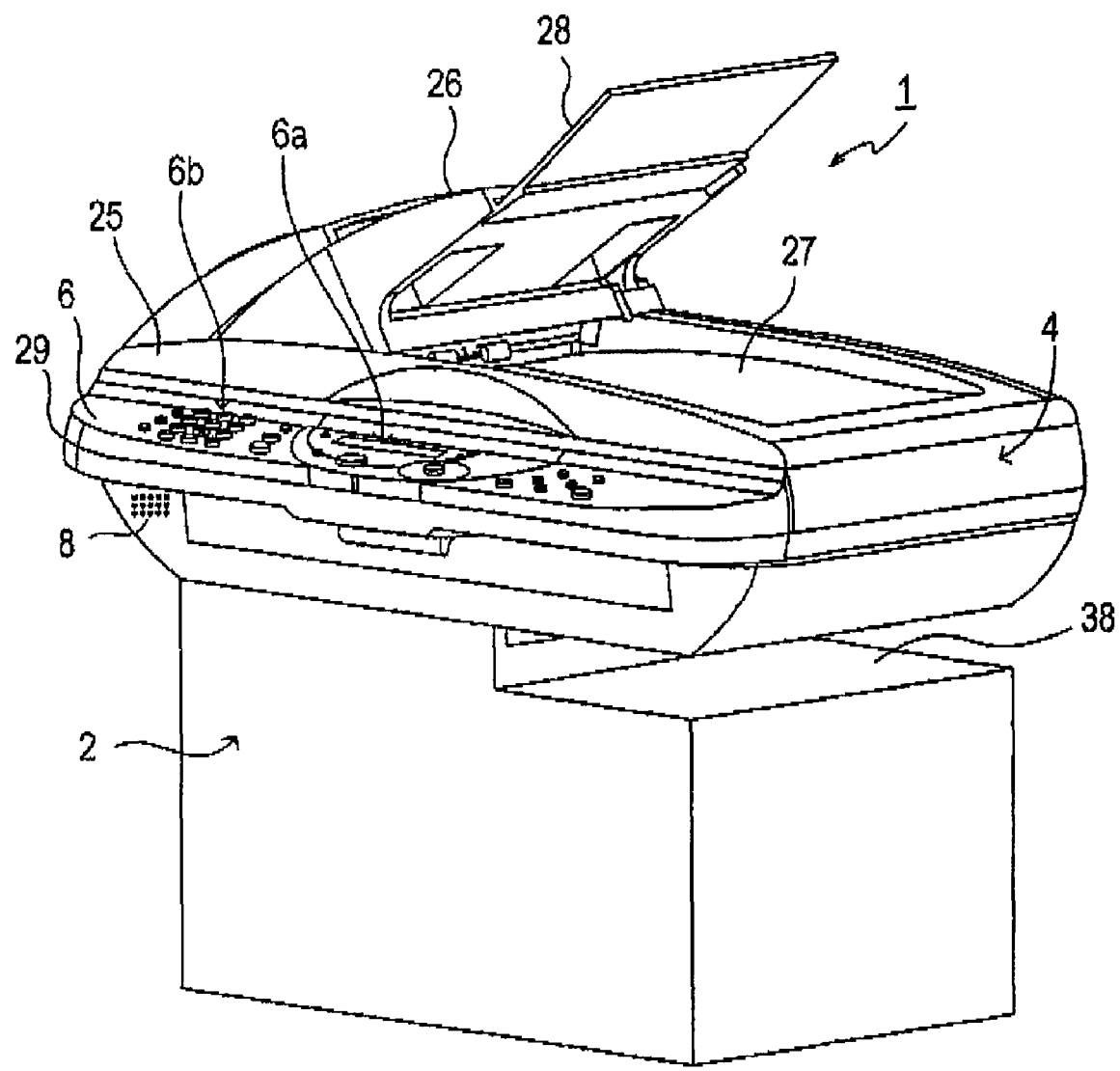
FIG. 1 is a perspective view showing an appearance of a multifunction apparatus in an embodiment of the present invention.

As shown in FIG. 1, a multifunction apparatus 1 in an embodiment of the present invention includes a printer unit 2 located in a lower portion of the multifunction apparatus 1 and a scanner unit 4 located in an upper portion of the multifunction apparatus 1.

The multifunction apparatus 1 is capable of performing a scanner function, a printer function, a copier function, and a facsimile (hereinafter also referred to as a "FAX") function for reading an image on a document as image data. In the scanner function, an image on a document is read as image data. In the printer function, an image based on image data is printed on a sheet. The copier function is performed by a combination of the scanner function and the printer function. In the FAX function, transmission/reception of image data is performed through a public telephone network 100, and received image data is temporarily stored in a memory (e.g., a buffer 12 shown in FIG. 13) and is printed later on a sheet.

An operation panel 6 is disposed in a front upper portion of the multifunction apparatus 1. The operation panel 6 includes an LCD (liquid crystal display) portion 6a for displaying an operating state and the like of the multifunction apparatus 1, and a variety of operation buttons 6b for inputting a variety of commands.

A notification unit 8 for outputting an alarm sound and an audio sound is also disposed in the front upper portion of the multifunction apparatus 1. The notification unit 8 includes a speaker, an amplifier, and others.

A document platform cover 25 is disposed in the front upper portion of the multifunction apparatus 1. A hinge portion 29 is disposed in a left end portion of the multifunction apparatus 1 seen from a front direction. The document platform cover 25 is upwardly rotatable around the hinge portion 29.

Figure 2:
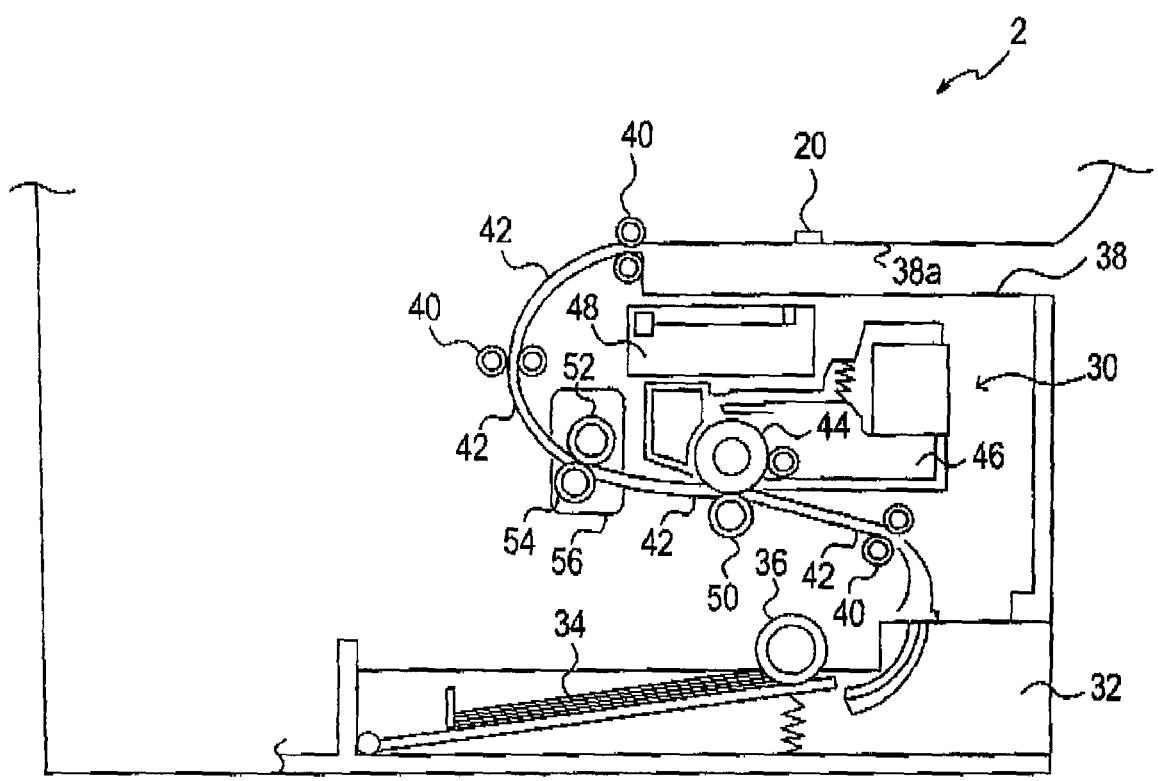
FIG. 2 is a cross-sectional view showing a schematic structure of a printer unit of the multifunction apparatus.

Although the printer unit 2 shown in FIG. 1 has a substantially rectangular parallelepiped configuration, the printer unit 2 also includes a sheet feed cassette 32 shown in FIG. 2.

The scanner unit 4 of a flat-bed type is configured to read an image from a document placed on a platen glass (not shown) by means of a line-type CCD unit. An ADF (Auto Document Feeder) mechanism 26 for sequentially reading images from a plurality of sheets of a document is provided in an upper left end portion of the document platform cover 25. The ADF mechanism 26 is configured to take in the document sheet by sheet from a document feed tray 28, have the CCD unit perform reading of the images on the document line by line, and discharge the document after the reading of the images onto a document discharge tray 27. Accordingly, the scanner unit 4 is capable of reading images on the plurality of sheets of the document loaded on the document feed tray 28 sequentially sheet by sheet.

As shown in FIG. 2, the printer unit 2 includes a printer engine 30, the sheet feed cassette 32, a sheet feed roller 36, a plurality of conveyance rollers 40, and a sheet guide 42. The sheet feed cassette 32 contains a plurality of sheets of recording paper 34 as a recording medium in a stacked manner. The sheet feed roller 36 feeds the recording paper 34 contained in the sheet feed cassette 32 sheet by sheet toward the printer engine 30. The conveyance rollers 40 convey the recording paper 34 fed through the sheet feed roller 36 toward the printer engine 30 and discharge the recording paper 34 after image formation into a sheet discharge tray 38.

The sheet feed cassette 32 is mounted by inserting the sheet feed cassette 32 into the multifunction apparatus 1 from outside in a lower end portion of a right side of the multifunction apparatus 1 seen from a front side.

The sheet discharge tray 38 is provided between the scanner unit 4 and the printer unit 2, that is, above the printer unit 2. The sheet discharge tray 38 includes a surface on which the sheets of the recording paper 34 are stacked and an opposed surface (hereinafter also referred to as an "upper tray surface 38a"). A height sensor 20 including, for example, an infrared light emitting diode and a photodiode as a position detecting element is provided in the upper tray surface 38a. The height sensor 20 detects a distance between an upper surface of the stacked recording paper 34 and the upper tray surface 38a based on a light reception timing of a reflected light reflected by the upper surface of the stacked recording paper 34 in the sheet discharge tray 38.

The printer engine 30 includes a toner cartridge 46, a laser emitter 48, a transfer roller 50, and a fixing device 56. The toner cartridge 46 houses a photosensitive drum 44. The laser emitter 48 emits a laser beam to the photosensitive drum 44 thereby to form an electrostatic latent image on the photosensitive drum 44. The transfer roller 50 presses the recording paper 34 onto the photosensitive drum 44 with toner adhered to the electrostatic latent image formed by the laser emitter 48 thereby to form a toner image on the recording paper 34. The fixing device 56 fixes an image on the recording paper 34 by pressing the recording paper 34 carrying the formed toner image with a heating roller 52 and a pressure roller 54.

According to the printer engine 30 in the present embodiment, which is for use in a known laser printer, an image corresponding to image data inputted in the laser emitter 48 is formed on the recording paper 34.

An electric configuration of the multifunction apparatus 1 of the present embodiment will now be described with reference to FIG. 3.

Figure 3:
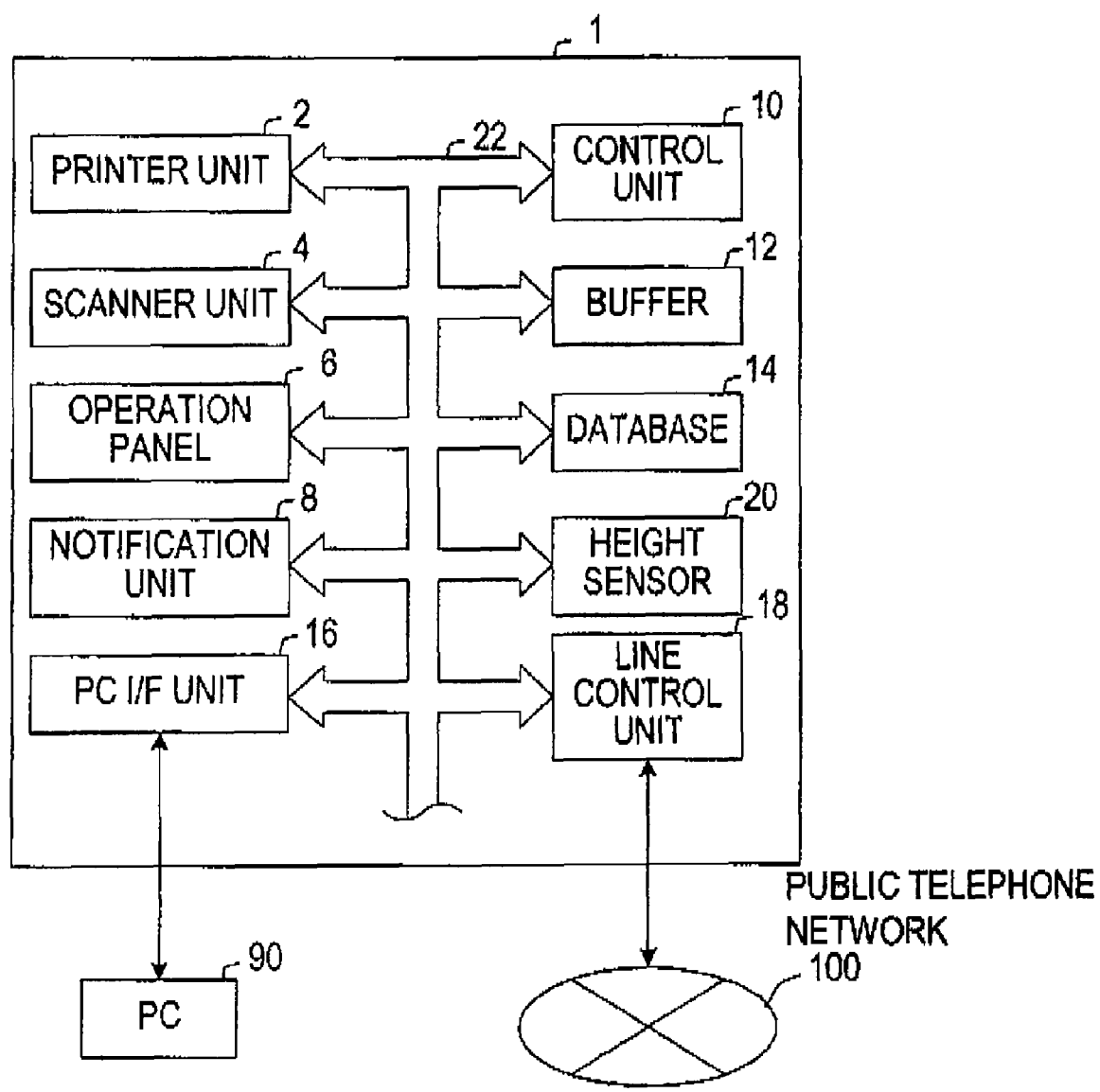
FIG. 3 is a block diagram showing a schematic configuration of the multifunction apparatus.

As shown in FIG. 3, the multifunction apparatus 1 in the present embodiment includes a control unit 10, the buffer 12, a database 14, a PC interface unit (hereinafter referred to as a "PC-I/F unit") 16, a line control unit 18, etc. that are interconnected through a bus line 22, in addition to the printer unit 2, the scanner unit 4, the operation panel 6, the notification unit 8, and the height sensor 20 as described above.

The buffer 12 temporarily stores image data received through the PC-I/F unit 16 and the line control unit 18, and image data read by the scanner unit 4.

The database 14 constituted by a rewritable nonvolatile memory (e.g., an EEPROM) stores control parameters required for performing a variety of processings by the control unit 10 and a variety of information registered by a user, such as a telephone directory including a name, a company name, a telephone number, a FAX number, etc.

The PC-I/F unit 16 is an interface for connecting the multifunction apparatus 1 to a PC 90 through a communication cable.

The line control unit 18 performs a line control, including transmission of a calling signal in accordance with a command from the operation button 6a and reception of a calling signal. At the time of FAX transmission, the line control unit 18 converts image data read by the scanner unit 4 into a modulated signal corresponding to a frequency band of the public line network and transmits the modulated signal. At the time of FAX reception, the control unit 18 demodulates a modulated signal transmitted through the public line network and converts the demodulated signal into image data.

The line control unit 18, to which a decoding unit (not shown) and an encoding unit (not shown) are connected, encodes the image data before conversion into the modulated signal at the time of FAX transmission, and decodes the demodulated image data at the time of FAX reception.

The control unit 10 is constituted by a known microcomputer mainly including a CPU, a ROM, a RAM, and the like. The control unit 10 controls these components in accordance with a command inputted by a user through the operation buttons 6b of the operation panel 6 and a command inputted from an external device, such as a FAX machine, through the external PC 90 or a public telephone network 100. Thus, the multifunction apparatus 1 of the present embodiment may function as a printer, a scanner, a copier, and a FAX machine.

Specifically, when the control unit 10 receives a print request from the PC 90, the control unit 10 receives image data subsequently transmitted from the PC 90, and temporarily stores the received image data in the buffer 12. When reception of the image data is completed, the control unit 10 controls the printer unit 2 so as to form an image, based on the image data stored in the buffer 12, on the recording paper 34.

When a read request of an image on a document is inputted by the user through the PC 90 or the operation panel 6, the control unit 10 controls the scanner unit 4 so as to read the image and stores read image data in the buffer 12. When reading of the image on the document is completed, the control unit 10 transmits the image data stored in the buffer 12 to the PC 90 based on a predetermined operation mode, and stores the image data in a memory installed in the PC 90 or in the database 14. According to the procedure described above, the multifunction apparatus 1 of the present embodiment may operate as a printer or a scanner.

When a copy request is inputted by the user through the operation panel 6, the control unit 10 controls the scanner unit 4 in accordance with an operation mode currently set regarding copying so as to read an image on a document placed by the user and stores read image data in the buffer 12. When reading of the image on the document is completed, the control unit 10 controls the printer unit 2 so as to form (i.e., copy) an image, based on the image data stored in the buffer 12, on the recording paper 34.

When the control unit 10 receives a document reception request from an external device, for example, a FAX machine, through the line control unit 18, the control unit 10 receives image data subsequently transmitted from the FAX machine, and temporarily stores the received image data in the buffer 12. When reception of the image data is completed, the control unit 10 controls the printer unit 2 so as to form (reproduce) an image, based on the image data stored in the buffer 12, on the recording paper 34.

When a FAX command is inputted by the user through the operation panel 6, the control unit 10 controls the scanner unit 4 in accordance with an operation mode currently set regarding facsimile so as to read an image on a document placed by the user and stores read image data in the buffer 12. When reading of the image on the document is completed, the control unit 10 transmits the image data stored in the buffer 12 to a transmission destination specified through the line control unit 184

When a command for setting a variety of operation modes (a variety of detailed settings regarding the copier function, the FAX function, the scanner function, and the printer function) of the multifunction apparatus 1 is inputted by the user through the operation panel 6, the control unit 10 displays a screen for operation mode setting on the LCD portion in accordance with the command. Then, the control unit 10 reads a further command input by the user following instructions on the screen, and appropriately stores read parameters in a storage area, such as the RAM, the database 14, or the like, thereby to set an operation mode of the multifunction apparatus 1.

As described above, when the control unit 10 receives a print request from the PC 90, a document reception request from an external FAX machine, or a copy command by the user, the control unit 10 performs a process of forming an image on the recording paper 34 in accordance with received image data or image data read from the document and of discharging the recording paper 34 carrying the formed image into the sheet discharge tray 38.

Particularly, in the present embodiment, the control unit 10 performs an image forming process including monitoring a loaded ratio (actual loaded height/fully loaded height) of the recording paper 34 in the sheet discharge tray 38. The image forming process also includes preventing the sheet discharge tray 38 from being fully loaded by forming an image having a specified attribute (for example, image data in accordance with a copy command) on the recording paper 34 and thus preventing image formation of image data having a different attribute (for example, image data received from the FAX machine) on the recording paper 34 from becoming unable.

Figure 4:
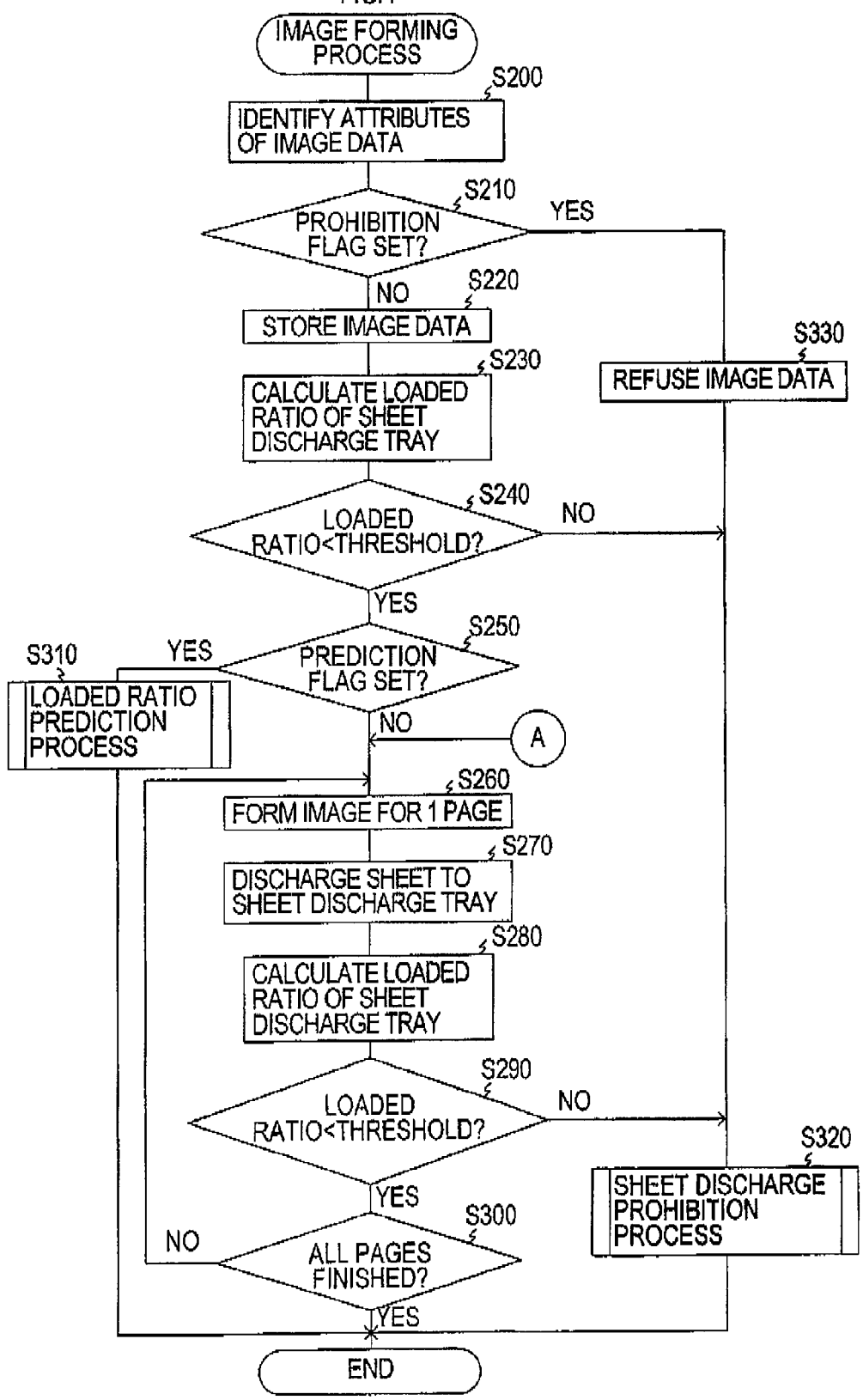
FIG. 4 is a flowchart showing an image forming process in the present embodiment.

The image forming process performed by the control unit 10 of the present embodiment will be described below with reference to FIG. 4.

The image forming process in the present embodiment is started by an input of a print request from the PC 90, a document reception request from an external FAX machine, or a copy command by the user. In S200, based on information included in the received request or the command inputted through the operation panel 6, an attribute of image data to be received from a request source or read from the document are identified. The attribute of image data is, for example, "Copy", "PC Print", "FAX", "Administrator's PC Print", or "FAX from a Predetermined Sender", as shown in FIG. 5.

The control unit 10 identifies the attribute of image data based on information, such as a login name of the PC 90, a document type, a document name, a date, and a time, which is included in the print request from the PC 90, a telephone number of the FAX machine included in the document reception request from the FAX machine, or the command inputted through the operation panel 6.

In S210, it is determined whether or not a prohibition flag corresponding to the identified attribute of image data is set. The prohibition flag is set when image formation based on image data having a specified attribute, and thus discharge of the recording paper 34 to the sheet discharge tray 38 is prohibited. The prohibition flag is reset when such image formation is permitted. When it is determined that a prohibition flag corresponding to the identified attribute of image data is not set (S210: NO), it is determined that image formation based on image data having the identified attribute is permitted. Then, the present process proceeds to S220.

In S220, in a case where a print request or a document reception request is received in S200, image data received subsequent to the request is stored in the buffer 12. In a case where a copy command is received in S200, image data read from a document by controlling the scanner unit 4 is stored in the buffer 12. Then, the present process proceeds to S230.

In S230, a distance detected by the height sensor 20 (i.e., the distance between the upper surface of the stacked recording paper 34 and the upper tray surface 38a) is read, and calculation of a loaded ratio of the sheet discharge tray 38 is performed based on the read distance.

In S240, it is determined whether or not the calculated loaded ratio is smaller than a predetermined threshold. The predetermined threshold is a value set for each attribute of image data as shown in FIG. 5. The predetermined threshold is a maximum value of the loaded ratio (THRESHOLD OF LOADED RATIO in FIG. 5) of the sheet discharge tray 38, up to which discharge of the recording paper 34 to the sheet discharge tray 38 is permissible. Each threshold is previously registered by the user or an apparatus administrator.

When it is determined in S240 that the loaded ratio is smaller than the threshold (S240: YES), the present process proceeds to S250. In S250, it is determined whether or not a prediction flag is set. The prediction flag indicates whether or not to perform a prediction process to predict whether or not the loaded ratio of the recording paper 34 will exceed the threshold if image formation is performed on the recording paper 34 based on the input image data. The prediction flag is set or reset by the user or the apparatus administrator through the operation panel 6.

When it is determined in S250 that a prediction flag is set (S250: YES), the present process proceeds to S310. In S310, a later-described loaded ratio prediction process is performed. When the loaded ratio prediction process has been completed, the present image forming process is terminated.

When it is determined in S250 that a prediction flag is not set (S250: NO), the present process proceeds to S260. In S260, image formation on the recording paper 34 is performed by controlling the printer unit 2. Specifically, in S260, an image for one page is formed on the recording paper 34.

Subsequently, in S270, the recording paper 34 carrying the image is discharged to the sheet discharge tray 38. In S280, a loaded ratio is calculated based on a value detected by the height sensor 20. In S290, it is determined whether or not the calculated loaded ratio is smaller than the predetermined threshold. When it is determined that the calculated loaded ratio is smaller than the predetermined threshold (S290: YES), the present process proceeds to S300.

In S300, it is determined whether or not image formation for all pages based on the image data has been completed. When it is determined that image formation for all pages has not been completed (S300: NO), the present process returns to S260. Then, processings from S260 are performed, i.e., image formation for the next page is performed. When it is determined that image formation for all pages has been completed (S300: YES), the present process is terminated.

When it is determined in S210, that a prohibition flag corresponding to the identified attribute of image data is set (S210: YES), the present process proceeds to S330. In S330, reception of image data is refused in a case where a print request or a document reception request is received in S200. Then, the present process proceeds to S320, and a later-described sheet discharge prohibition process is performed. In a case where a copy request is received in S200, the present process directly proceeds to S320, and the sheet discharge prohibition process is performed.

When it is determined in S240 that the loaded ratio is equal to or larger than the threshold (S240: NO), or when it is determined in S290 that the loaded ratio is equal to or larger than the threshold (S290: NO), the present process proceeds to S320. When a sheet discharge prohibition process in S320 is completed, the present process is terminated.

Figure 6:
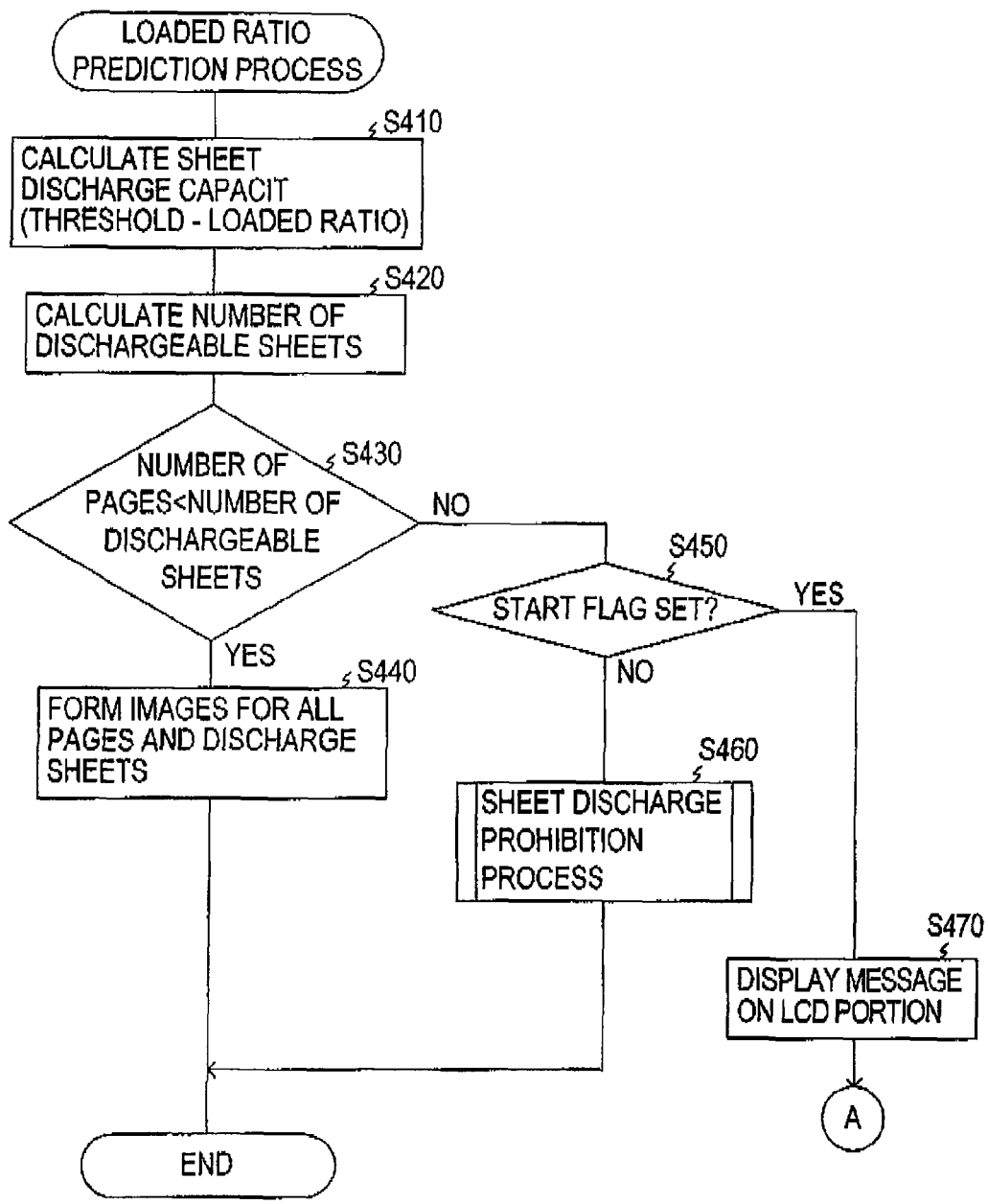
FIG. 6 is a flowchart showing a loaded ratio prediction process in the present embodiment.

A loaded ratio prediction process performed in S310 will be described below with reference to FIG. 6.

When the loaded ratio prediction process is started, a number of sheets of the recording paper 34 that can be discharged to the sheet discharge tray 38 is calculated. Specifically, in S410, a difference between the loaded ratio calculated in S220 and the threshold is calculated. In S420, the number of sheets of the recording paper 34 that can be discharged (hereinafter also referred to as a "number of dischargeable sheets") is calculated based on the difference between the loaded ratio and the threshold, and a predetermined thickness of a sheet of the recording paper 34.

In S430, it is determined whether or not a number of pages of inputted image data is smaller than the number of dischargeable sheets. When it is determined that the number of pages of image data is smaller than the number of dischargeable sheets (S430: YES), the present process proceeds to S440. In S440, images for all pages corresponding to entire image data are formed on the recording paper 84 by controlling the printer unit 2, and the recording paper 34 is discharged to the sheet discharge tray 38. Then, the present process is terminated.

When it is determined in S430 that the number of pages of image data is equal to or larger than the number of dischargeable sheets (S430: NO), the present process proceeds to S450. In S450, it is determined whether or not a start flag is set. The start flag indicates whether or not to start image formation in a case where the loaded ratio of the recording paper 34 will exceed the threshold if image formation for all pages is performed. The start flag is set or reset by the user or the apparatus administrator through the operation panel 6.

When it is determined in S450 that the start flag is not set (S450: NO), the present process proceeds to S460. In S460, the later-described sheet discharge prohibition process is performed. When the sheet discharge prohibition process is completed, the present process is terminated.

When it is determined in S450 that the start flag is set (S450: YES), the present process proceeds to S470. In S470, a message indicating that the loaded ratio of the sheet discharge tray 38 will exceed the threshold if image formation is performed is displayed on the LCD portion 6a. An example of the message is "Remove the recording paper to avoid full loading of the sheet discharge tray." Also in S470, an alarm sound is generated from the notification unit 8.

Then, the present process proceeds to S260 in the image forming process, and image formation is started. Since the loaded ratio of the sheet discharge tray 38 has not exceeded the threshold at the current moment, image formation continues to be performed until the loaded ratio has exceeded the threshold, while display of the message and the alarm sound give a warning that the loaded ratio will exceed the threshold.

Figure 7:
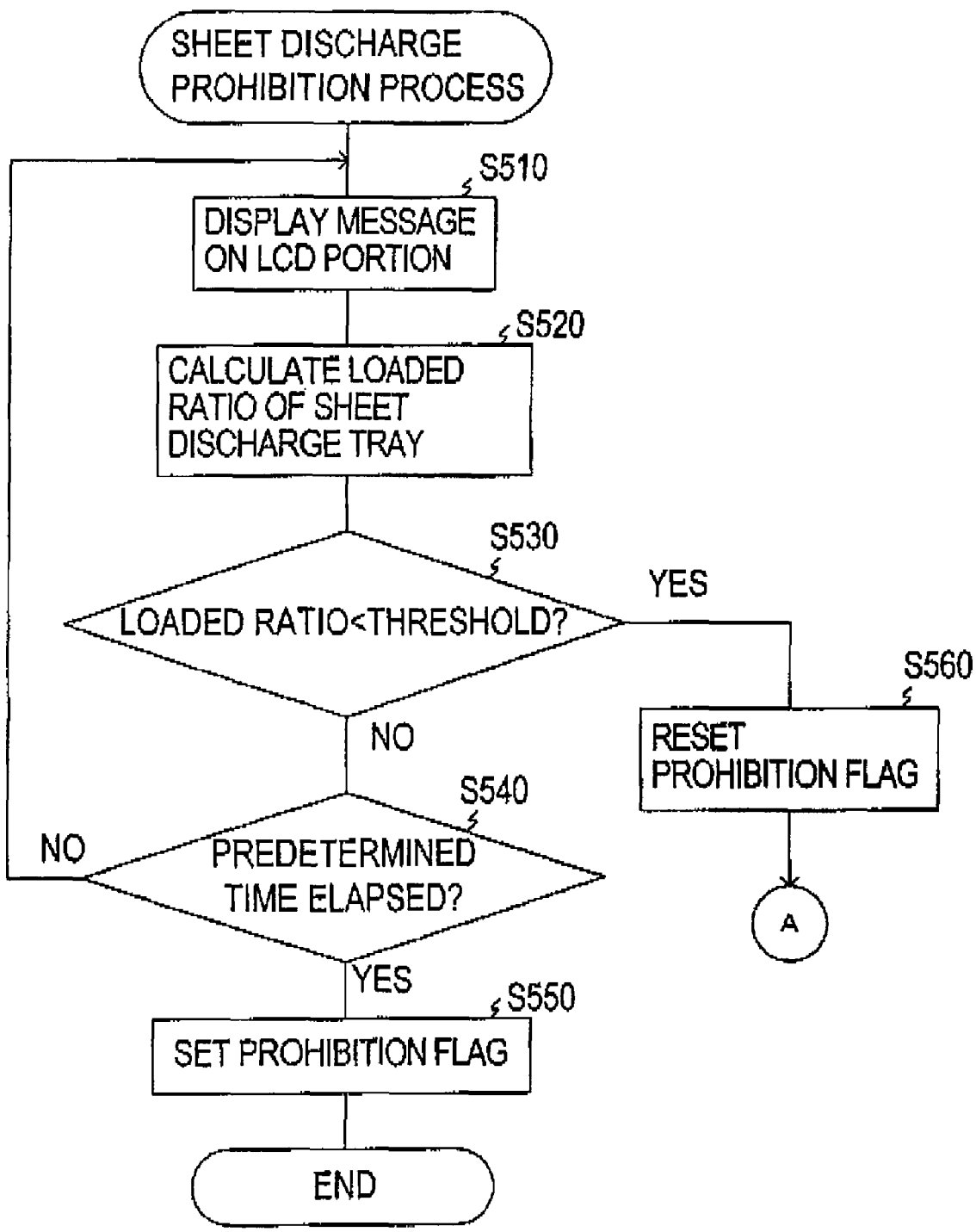
FIG. 7 is a flowchart showing a sheet discharge prohibition process in the present embodiment.

The sheet discharge prohibition process to be performed in S320 and S460 will be described below with reference to FIG. 7.

When the sheet discharge prohibition process is started, a message (for example, "Remove the recording paper from the sheet discharge tray.") requesting to remove the recording paper 34 is displayed on the LCD portion 6a and an alarm sound is generated by the notification unit 8 in S510. Then, the present process proceeds to S520. In S520, a loaded ratio is calculated based on a value detected by the height sensor 20.

Subsequently in S 530, it is determined whether or not the calculated loaded value is smaller than a predetermined threshold. When it is determined that the calculated loaded value is smaller than the threshold (S530: YES), the present process proceeds to S560. In S560, a prohibition flag corresponding to the attribute of image data is reset. Specifically, when the user removes the recording paper 34, for example, after seeing the above message, the loaded ratio becomes smaller than the threshold. In this case, the prohibition flag is reset thereby to permit image formation based on image data having the attribute.

When it is determined that the calculated loaded value is equal to or larger than the threshold (S530: NO), the present process proceeds to S540. In S540, it is determined whether or not a predetermined time has elapsed since the message is displayed on the LCD portion 6.

When it is determined that the predetermined time has not elapsed (S540: NO), the present process returns to S510. The processings from S510 to S540 are repeatedly performed until the recording paper 34 is removed from the sheet discharge tray 38 or the predetermined time has elapsed. When it is determined that the predetermined time has elapsed (S540: YES), the present process proceeds to S550. In S550, the prohibition flag is set, and then the present process is terminated. That is, image formation based on the inputted image data is not performed since the loaded ratio of the sheet discharge tray 38 does not change. Also, by setting the prohibition flag, image formation is not performed even if image data having the same attribute is inputted.

In the multifunction apparatus 1 of the present embodiment as described above, when a print request from the PC 90, a document reception request from an external FAX machine, or a copy command by the user is inputted, an attribute of image data subsequently received or read by the scanner unit 4 is identified. Also, a loaded ratio of the recording paper 34 in the sheet discharge tray 38 is calculated based on a value detected by the height sensor 20. When the loaded ratio of the sheet discharge tray 38 is equal to or larger than a predetermined threshold corresponding to the attribute of the image data, image formation based on the image data is not started.

According to the multifunction apparatus 1 of the present embodiment, when the loaded ratio of the sheet discharge tray 38 is, for example, equal to or larger than the threshold (two-thirds) predetermined with respect to "copy" and "PC print", image formation based on image data having these attributes is not performed. In contrast, only image formation may be performed based on image data having a specified attribute ("FAX", "Administrator's PC Print", and "FAX Received from a Predetermined Transmission Source") having the threshold of two-thirds or larger. Accordingly, image formation based on image data having a specified attribute may securely be performed.

Particularly, in the present embodiment, the threshold for FAX, regarding which it is necessary to request retransmission to a transmission source when image formation cannot be performed, is set at a value larger than the thresholds for other functions, such as "copy" and "PC print". Accordingly, image formation based on image data received from the FAX machine may securely be performed.

According to the multifunction apparatus 1 of the present embodiment, when the prediction flag is set, the number of dischargeable sheets of the recording paper 34 is calculated based on the difference between the loaded ratio and the threshold, and the predetermined thickness of a sheet of the recording paper 34. Then, it is determined whether or not the number of pages of inputted image data is smaller than the number of dischargeable sheets. By such a determination using the number of dischargeable sheets and the number of pages of the image data, it is predicted whether or not the loaded ratio of the sheet discharge tray 38 will exceed the threshold if image formation of all the pages based on the inputted image data is performed. Subsequently, it is determined whether or not to perform image formation based on the image data in accordance with whether or not the loaded ratio will exceed the threshold.

Accordingly, in a case where the loaded ratio of the sheet discharge tray 38 will exceed the threshold for "PC print", i.e., two-thirds, if image formation of the image data received from the PC 90 is performed, image formation based on the image data may be prevented. It may, therefore, be possible to securely perform image formation based on image data received from the FAX machine or image data received from the administrator's PC 90 with a predetermined threshold larger than the threshold for the image data received from the PC 90.

According to the multifunction apparatus 1 of the present embodiment, when the attribute of image data identified based on the inputted request or command is identical with the attribute of image data, regarding which it is previously determined that image formation should not be performed, reception or reading of the image data is prohibited, and thus the image data is not stored in the buffer 12. Accordingly, wasteful use of the buffer 12 for temporarily storing received image data or read image data may be prevented. When the loaded ratio is smaller than a threshold for an attribute, prohibition of reception or reading of image data of the attribute is cancelled. Therefore, when the recording paper 34 is removed from the sheet discharge tray 38, and thereby the loaded ratio is reduced, image data having an attribute for which the loaded ratio is smaller than the threshold may be received again.

According to the multifunction apparatus 1 of the present embodiment, when image formation should not be performed or when image formation for all the pages cannot be performed, a message requesting removal of the recording paper 34 is displayed on the LCD portion 6a and an alarm sound is generated from the notification unit 8. This may facilitate the user to recognize the current state.

While only one embodiment of the present invention has been described above, it will be understood that the present invention may be embodied in various forms without departing from the spirit and scope of the present invention.

For example, when the prediction flag is set, it is predicted whether or not the loaded ratio of the sheet discharge tray 38 after image formation will exceed the threshold if image formation based on the inputted image data is performed, in the above embodiment. Then, it is determined whether or not to perform image formation based on the image data in accordance with the prediction of whether or not the loaded ratio after image formation will exceed the threshold. However, it may always be determined whether or not to perform image formation based on the image data in accordance with whether or not the loaded ratio after image formation will exceed the threshold. In this case, determination between an actual loaded ratio of the sheet discharge tray 38 before image formation and the threshold may be omitted.

In the above embodiment, the number of dischargeable sheets of the recording paper 34 is calculated based on the difference between the loaded ratio and the threshold, and the predetermined thickness of a sheet of the recording paper 34. However, it may be possible to calculate an occupying ratio of the recording paper 34 to be discharged in the sheet discharge tray 38, and calculate a loaded ratio after image formation based on the calculated occupying ratio and a loaded ratio before image formation (i.e., an actual loaded ratio of the sheet discharge tray 38). In this case, it may be determined whether or not the calculated loaded ratio after image formation exceeds the threshold.

In the above embodiment, a loaded ratio of the recording paper 34 in the sheet discharge tray 38 is calculated, and by preventing image formation based on image data having a specified attribute, image formation based on image data having a different attribute is securely performed. However, a configuration may be possible in which a data occupying ratio in the buffer 12 or a memory capable of storing image data is detected.

For example, in a process based on a data occupying ratio in the buffer 12, when the control unit 10 receives a print request from the PC 90, a document reception request from an external FAX machine, or a copy command by the user, the control unit 10 identifies the attribute of image data and also detects a data occupying ratio in the buffer 12 at the moment. Subsequently, a comparison is made between the detected data occupying ratio in the buffer 12 and a maximum value of the data occupying ratio in the buffer 12, which is predetermined for each attribute of image data and up to which storage of image data into the buffer 12 is permissible. Then, it may be determined whether or not to store the image data into the buffer 12. According to the configuration as above, it may be possible to preferentially store image data having a specified attribute, such as "FAX", into the buffer 12 depending on the data occupying ratio in the buffer 12.

It may be possible to perform both the following processes. Specifically, one process is to prohibit image formation based on image data having a specified attribute depending on the loaded ratio of the sheet discharge tray 38 and thus to prohibit discharge to the sheet discharge tray 38. The other process is to prohibit storage of image data having a specified attribute into the buffer 12 depending on the data occupying ratio in the buffer 12.

It may also be possible to provide a plurality of memories capable of storing image data or a plurality of sheet discharge trays 38 such that image data or the recording paper 34 is stored or stacked in turn. In this case, it may be possible to prohibit storage into the memories or image formation on the recording paper 34 of image data having a specified attribute depending on whether or not a specified memory or a specified sheet discharge tray 38 is in use. Then, processing such as storage in the memory or image formation of image data having a different attribute, for example "FAX", from the specified attribute may securely be performed.

Attributes of image data and thresholds of the loaded ratio are not limited to the attributes and values used in the above embodiment, but a variety of attributes and values may be appropriately employed.

For example, "PC Print" or "FAX from a Specified User" may be employed in addition to "PC Print from Administrator's PC" or "FAX from a Specified FAX Machine". Specifically, when a user of the PC 90 issues a print request during a login using the user's ID, user identification information, such as the login name is included in the print request. When a user of a FAX machine issues a document transmission request while inputting user identification information, such as the user's ID, the user identification information is included in the document transmission request.

Accordingly, when the above request is transmitted, the control unit 10 may identify not only the specified apparatus but also the user of the apparatus from the received request. Thus, "PC Print" or "FAX from a Specified User" may be employed as an attribute of image data.

In the above embodiment, a loaded height of the recording paper is detected thereby to perform determination based on a loaded ratio as a ratio of an actual loaded height to a fully loaded height and a threshold in the loaded ratio. However, it may be possible, for example, to detect a number of sheets of the recording paper thereby to perform determination based on the number of sheets and a threshold in the number of sheets. It may also be possible to detect a weight of the recording paper thereby to perform determination based on the weight and a threshold in the weight.

What is claimed is:

1. An image data processing apparatus, comprising:
    a processor; and
    memory storing computer-readable instructions that, when executed, cause the processor to perform the following:
        execute a predetermined data processing of first image data;
        determine an actual loaded amount of recording media in a single discharge tray;
        identify an attribute of the first image data from among a plurality of attributes of image data;
        set a maximum loaded amount of recording media in the single discharge tray, up to which further discharge of recording media to the discharge tray is permissible, to a first specified value if the attribute of the first image data is a first attribute, and set the maximum loaded amount to a second specified value that is smaller than the first specified value if the attribute of the first image data is a second attribute different from the first attribute;
        determine, before executing the data processing, whether a predicted loaded amount of the recording medium loaded in the single discharge tray is in a first state or in a second state, the first state indicating that the loaded amount of the recording medium loaded in the single discharge tray is predicted not to be equal to or greater than the maximum loaded amount when the data processing is executed based on the first image data, and the second state indicating that the loaded amount of the recording medium loaded in the single discharge tray is predicted to be equal to or greater than the maximum loaded amount when the data processing is executed based on the first image data;
        cause removal of recording medium from the single discharge tray if it is determined that the predicted loaded amount of the recording medium loaded in the single discharge tray is in the second state;
        determine whether or not to start the data processing based on the first image data when it is determined that the predicted loaded amount of the recording medium loaded in the single discharge tray is in the second state;
        execute the data processing based on the first image data when the actual loaded amount is smaller than the maximum loaded amount and it is determined that the predicted loaded amount of the recording medium loaded in the single discharge tray is in the first state,
        execute the data processing based on the first image data until the actual loaded amount of the recording medium in the single discharge tray is equal to or larger than the maximum loaded amount, when the actual loaded amount is initially determined to be smaller than the maximum loaded amount, it is determined that the predicted loaded amount of the recording medium loaded in the single discharge tray is in the second state, and it is determined to start the data processing, and
        not to execute the data processing based on the first image data, when the actual loaded amount is smaller than the maximum loaded amount, it is determined that the predicted loaded amount of the recording medium loaded in the single discharge tray is in the second state, and it is determined not to start the data processing, or when the actual loaded amount is equal to or greater than the maximum loaded amount;
    wherein the data processing includes a process that causes forming of an image on a recording medium based on the first image data and further causes discharging, to the discharge tray, the recording medium on which the image has been formed, and the memory further stores instructions that, when executed, cause discharging, to the single discharge tray, a recording medium on which an image has been formed based on image data having a different attribute selected from the plurality of attributes of image data.

2. The image data processing apparatus according to claim 1, wherein the attribute of the first image data identifies a type of an external apparatus into which the first image data is inputted.

3. The image data processing apparatus according to claim 1, wherein the attribute of the first image data identifies a function to execute the data processing of the first image data.

4. The image data processing apparatus according to claim 1, further comprising:
    a sensor that detects an actual loaded amount of recording media in the discharge tray,
    wherein the sensor is used to determine the actual loaded amount of recording media in the single discharge tray.

5. The image data processing apparatus according to claim 1, further comprising:
    a receiver that is configured to receive second image data from an external source.

6. The image data processing apparatus according to claim 5,
    wherein the second image data has an attribute identical to the attribute of the first image data;
    wherein the memory stores additional computer-readable instructions that, when executed, further cause the processor to prohibit reception of the second image data by the receiver when it is determined not to execute the data processing.

7. The image data processing apparatus according to claim 6,
    wherein the memory stores additional computer-readable instructions that, when executed, further cause the processor to cancel the prohibition when the actual load amount becomes smaller than a specified maximum amount for the attribute of the second image data.

8. The image data processing apparatus according to claim 1,
    wherein the memory stores additional computer-readable instructions that, when executed, further cause the processor to provide an output indicating that it has been determined not to execute the data processing.

9. The image data processing apparatus according to claim 1, further comprising a plurality of processors.

10. The image data processing apparatus according to claim 1,
wherein a plurality of functions, including a facsimile function, are provided by the data processing apparatus, and a function of the plurality of functions is used to execute the data processing of the first image data, and
wherein the function is identified as the attribute of the first image data.

11. The image data processing apparatus according to claim 10, wherein the set maximum value corresponds to the facsimile function.

12. The image data processing apparatus of claim 1, wherein the determined actual loaded amount is a ratio expressed by an actual loaded height compared to a fully loaded height of recording media in the discharge tray.

13. The image data processing apparatus of claim 12, wherein the memory further stores instructions that, when executed, cause the following to occur: calculate a number of sheets of the recording medium that can be discharged to the single discharge tray based on a difference between the loaded height corresponding to the maximum loaded amount and the loaded height corresponding to the actual loaded amount and based on a predetermined thickness of a sheet of the recording medium, and determine that the predicted loaded amount of the recording medium loaded in the single discharge tray is in the first state when a number of pages of the first image data is greater than the number of dischargeable sheets of the recording medium.

14. The image data processing apparatus of claim 1,
wherein the image data processing apparatus is provided, as functions to execute the data processing, with at least a facsimile function for receiving image data through a public telephone network and executing the data processing based on the received image data, and a copier function for reading an image on a document as image data and executing the data processing based on the read image data, and
wherein the memory further stores instructions that, when executed, cause the following to occur: identify an attribute of the image data received from an external apparatus by the facsimile function as the first attribute, and identify an attribute of the image data read from a document by the copier function as the second attribute.

15. The image data processing apparatus of claim 1,
wherein the image data processing apparatus is provided, as functions to execute the data processing, with at least a facsimile function for receiving image data through a public telephone network and executing the data processing based on the received image data, and a printer function for receiving image data through other than a public telephone network and executing the data processing based on the read image data, and
wherein the memory further stores instructions that, when executed, cause the following to occur: identify an attribute of the image data received from an external apparatus by the facsimile function as the first attribute, and identify an attribute of the image data received from a personal computer by the printer function as the second attribute.

16. At least one non-transitory computer-readable medium having computer-executable instructions stored thereon that, when executed, cause at least one computing device to:
determine a loaded amount of recording media in a recording medium discharge tray;
identify an attribute of first image data for which data processing is requested;
store information identifying a first maximum loaded amount of recording media in the single discharge tray, up to which further discharge of recording media to the discharge tray is permissible, corresponding to a first image attribute, and information identifying a second maximum loaded amount that is smaller than the first maximum loaded amount and corresponding to a second attribute different from the first attribute;
determine not to execute the data processing if the identified attribute of the first image data is the first attribute and the loaded amount of recording media in the recording medium discharge tray is equal to or greater than the first maximum loaded amount;
determine to execute the data processing if the identified attribute of the first image data is the first attribute and the loaded amount of recording media in the recording medium discharge tray is less than the first maximum loaded amount;
determine not to execute the data processing if the identified attribute of the first image data is the second attribute different from the first attribute and the loaded amount of recording media in the recording medium discharge tray is equal to or greater than the second maximum loaded amount;
determine to execute the data processing if the identified attribute of the first image data is the second attribute and the loaded amount of recording media in the recording medium discharge tray is less than the second maximum loaded amount; and
cause execution of the data processing of the first image data if it is determined to execute the data processing, wherein the data processing forms
an image on a recording medium based on the first image data.

17. The at least one non-transitory computer-readable medium of claim 16, wherein a type of an external apparatus into which the first image data is inputted is identified as the attribute of the first image data.

18. The at least one non-transitory computer-readable medium of claim 16, wherein a function to execute the data processing of the first image data is identified as the attribute of the first image data.

19. The at least one non-transitory computer-readable medium of claim 16, having additional computer-executable instructions stored thereon that, when executed, further cause the at least one computing device to:
provide an output indicating that it has been determined not to execute the data processing.

* * * * *